US012589714B2

(12) United States Patent
Mayer et al.

(10) Patent No.: US 12,589,714 B2
(45) Date of Patent: Mar. 31, 2026

(54) METHOD FOR OPERATING A MOTOR VEHICLE, SYSTEM

(71) Applicant: Robert Bosch GmbH, Stuttgart (DE)

(72) Inventors: Florian Mayer, Yokohama (JP);
Christian Cosyns, Peine (DE);
Matthias Moerbe, Ilsfeld-Helfenberg
(DE)

(73) Assignee: ROBERT BOSCH GMBH, Stuttgart
(DE)

( * ) Notice: Subject to any disclaimer, the term of this
patent is extended or adjusted under 35
U.S.C. 154(b) by 182 days.

(21) Appl. No.: 18/546,319

(22) PCT Filed: Feb. 22, 2022

(86) PCT No.: PCT/EP2022/054325
§ 371 (c)(1),
(2) Date: Aug. 14, 2023

(87) PCT Pub. No.: WO2022/207190
PCT Pub. Date: Oct. 6, 2022

(65) Prior Publication Data
US 2024/0132018 A1    Apr. 25, 2024
US 2024/0227729 A9    Jul. 11, 2024

(30) Foreign Application Priority Data

Mar. 30, 2021    (DE) ..................... 10 2021 203 163.3

(51) Int. Cl.
*B60R 25/10*        (2013.01)
*B60R 25/24*        (2013.01)
(Continued)

(52) U.S. Cl.
CPC .............. *B60R 25/24* (2013.01); *B60R 25/10*
(2013.01); *B60R 25/403* (2013.01);
(Continued)

(58) Field of Classification Search
None
See application file for complete search history.

(56) References Cited

U.S. PATENT DOCUMENTS 3,881,461 A  *  5/1975  Filip ....................... F02D 11/02
                                                    74/489
9,047,494 B1 *  6/2015  Smith ..................... G06F 21/88
                      (Continued)

FOREIGN PATENT DOCUMENTS

DE        102017200668 A1     7/2018
DE        102020203457 A1    10/2020
                    (Continued)

OTHER PUBLICATIONS

International Search Report for PCT/EP2022/054325, Issued May
20, 2022.

*Primary Examiner* — James M McPherson
(74) *Attorney, Agent, or Firm* — NORTON ROSE
FULBRIGHT US LLP

(57)            ABSTRACT

A method for operating a motor vehicle having at least one
vehicle communication arrangement fixed to the body. Sig-
nals are emitted by a user device, which can be handled
independently of the motor vehicle and can be assigned or
is assigned to a driver of the motor vehicle, and are received
by the vehicle communication arrangement. A distance
between the user device and the motor vehicle is monitored
on the basis of the received signals. Provision is made for the
distance to be monitored during operation of the motor
vehicle and for a safety operating state of the motor vehicle
to be activated when a distance exceeding a predefined
threshold value is detected.

13 Claims, 2 Drawing Sheets

(51) Int. Cl.

| | | |
|---|---|---|
| *B60R 25/40* | (2013.01) |
| *B62K 11/00* | (2006.01) |
| *B62M 27/02* | (2006.01) |
| *B63B 34/10* | (2020.01) |

(52) U.S. Cl.
CPC ..... *B60R 2325/101* (2013.01); *B60R 2325/20* (2013.01); *B62K 11/00* (2013.01); *B62M 27/02* (2013.01); *B63B 34/10* (2020.02)

(56) References Cited

U.S. PATENT DOCUMENTS

| | | | |
|---|---|---|---|
| 10,793,245 B1* | 10/2020 | Trotter | G08B 7/06 |
| 11,370,391 B1* | 6/2022 | Gammelgard | B60R 25/31 |
| 2004/0156327 A1 | 8/2004 | Yankielun et al. | |
| 2005/0283302 A1* | 12/2005 | Zakrewski | B60R 25/1003 |
| | | | 701/112 |
| 2011/0010024 A1* | 1/2011 | Salisbury | G05D 1/0016 |
| | | | 701/2 |
| 2017/0174178 A1* | 6/2017 | Nixon | B60R 25/102 |
| 2017/0236346 A1 | 8/2017 | Murar et al. | |
| 2017/0297543 A1* | 10/2017 | Miura | B60K 28/04 |
| 2017/0361814 A1* | 12/2017 | Natoli | B60T 7/14 |
| 2018/0072263 A1* | 3/2018 | Green | B60R 21/0136 |
| 2019/0040810 A1* | 2/2019 | Andersson | F02D 41/04 |
| 2020/0000166 A1* | 1/2020 | Hui | G01S 19/25 |
| 2021/0009235 A1* | 1/2021 | Okada | B62J 50/225 |

FOREIGN PATENT DOCUMENTS

| | | | |
|---|---|---|---|
| EP | 3260324 A1 | 12/2017 |
| GB | 2523842 A | 9/2015 |
| WO | 2005125108 A1 | 12/2005 |
| WO | 2018206418 A1 | 11/2018 |
| WO | 2020002392 A1 | 1/2020 |

* cited by examiner

METHOD FOR OPERATING A MOTOR VEHICLE, SYSTEM

FIELD

The present invention relates to a method for operating a motor vehicle having at least one vehicle communication means (i.e., arrangement) fixed to the body, wherein signals are emitted by a user device, which can be handled independently of the motor vehicle and can be assigned or is assigned to a driver of the motor vehicle, and are received by the vehicle communication means, and wherein a distance between the user device and the motor vehicle is monitored on the basis of the received signals.

In addition, the present invention relates to a system having a motor vehicle.

BACKGROUND INFORMATION

Methods of the aforementioned type are convention. For example, PCT Patent Application No. WO 2018 206 418 A1 describes a method in which signals are emitted by a user device and received by an on-board vehicle communication means assembly having a plurality of vehicle communication means. A distance between the user device and the motor vehicle is monitored on the basis of the received signals. The motor vehicle is eventually optionally unlocked or not unlocked depending on the detected distance.

PCT Patent Application No. WO 2020 002 392 A1 describes a further method in which a motor vehicle is optionally unlocked or not unlocked depending on the current position of a user device in the vicinity of the motor vehicle.

In addition, it is conventional to use a safety line for motor vehicles such as jet skis or snowmobiles, the line being connected to the motor vehicle on the one hand and to the driver on the other hand. If the driver falls off the motor vehicle while driving, the safety line will detach from the motor vehicle. This initiates a mechanism that leads to the shutdown of the drive device of the motor vehicle.

SUMMARY

In a method according to the present invention, the distance is monitored during operation of the motor vehicle and a safety operating state of the motor vehicle is activated when a distance exceeding a predefined threshold value is detected. A safety operating state means a state of the motor vehicle in which the operation of the motor vehicle is at least restricted. In this respect, by activating the safety operating state, unrestricted operation of the motor vehicle is interrupted. Preferably, the safety operating state is a state of the motor vehicle in which actuation of an acceleration specifying device of the motor vehicle does not cause a drive device of the motor vehicle to generate an accelerating torque that accelerates the motor vehicle. The present invention is based on the recognition that loss of and/or damage to the motor vehicle can be avoided by the procedure according to the present invention. If, during operation of the motor vehicle, the distance between the user device and the motor vehicle exceeds the predefined threshold value, it is to be assumed that the driver is no longer on the motor vehicle. In this case, it is not desirable for the drive device to provide an acceleration torque. Preferably, a value of 1 m to 10 m is predefined as a threshold value. If an element is "fixed to the body," the element is disposed directly or indirectly on the body of the motor vehicle, in particular on a support structure of the body. It is preferably the distance between the user device and the vehicle communication means that is monitored as the distance between the user device and the motor vehicle. Preferably, the safety operating state of the motor vehicle is put into effect fully automatically by a controller. Preferably, the safety operating state of the motor vehicle is activated immediately when the distance exceeding the threshold value is detected. Preferably, the motor vehicle is designed as a motorcycle, quad, jet ski, or snowmobile.

According to a preferred embodiment of the present invention, it is provided that the safety operating state of the motor vehicle is activated by shutting down the drive device. This very reliably interrupts the unrestricted operation of the motor vehicle. Alternatively, the safety operating state of the motor vehicle is activated by blocking the actuation of the drive device. Correspondingly, an actuation of the acceleration specifying device is no longer implemented by the drive device.

According to a preferred embodiment of the present invention, when the distance exceeding the threshold value is detected, a braking device of the motor vehicle is actuated to generate a braking torque. This prevents the motor vehicle from moving away from the driver, for example by coasting to a stop. The motor vehicle thus comes to a standstill more quickly.

According to a preferred embodiment of the present invention, the location of the user device is detected in the direction of the longitudinal axis of the motor vehicle, and the braking device is actuated based on the detected location. According to this embodiment, the motor vehicle preferably comprises at least one further vehicle communication means (i.e., arrangement), wherein the vehicle communication means and the further vehicle communication means are fixed to the body at a distance from one another. By providing at least two vehicle communication means, not only can the distance between the user device and the motor vehicle be monitored, but also the location of the user device relative to the motor vehicle. For example, the vehicle communication means is arranged in the area of a front end of the motor vehicle and the further vehicle communication means is arranged in the area of a rear end of the motor vehicle. Arranging the vehicle communication means in this way allows the location of the user device in the direction of the longitudinal axis to be monitored. For example, the braking device is actuated only when it is detected that the user device is located in front of the motor vehicle in the direction of the longitudinal axis, i.e., in the direction of forward travel. Such a user device location can occur, for example, when the motor vehicle travels over a bump and the driver falls forward off of the motor vehicle. By actuating the braking device, it can then be prevented that the motor vehicle strikes the driver.

Preferably, according to an example embodiment of the present invention, the motor vehicle and/or the user device emits an emergency call signal fully automatically when the distance exceeding the threshold value is detected. If the distance exceeds the threshold value, this is indicative of an accident involving the motor vehicle. Generally, it is desirable to emit an emergency call signal when this happens.

According to a preferred embodiment of the present invention, it is provided that the emergency call signal contains information regarding the traveling speed of the motor vehicle at the time of detection of the distance exceeding the threshold value and/or regarding the distance of the user device from the motor vehicle after the deceleration of the motor vehicle to a standstill. The information listed above can facilitate a rescue operation plan.

According to a preferred embodiment of the present invention, it is provided that a time period is predefined, and that the safety operating state of the motor vehicle is activated only after the time period has elapsed. In principle, the distance between the user device and the motor vehicle can also increase beyond the threshold value if the motor vehicle is stolen by a thief while it is in operation. In such a situation, it is advantageous, with respect to the safety of the driver, that the thief and the motor vehicle first move away from the driver. For example, a time period of 30 seconds to 5 minutes is predefined as the time period.

According to a preferred embodiment of the present invention, it is provided that a distance is predefined and that the safety operating state of the motor vehicle is activated only after the motor vehicle has traveled the predefined distance after the detection of the distance exceeding the threshold value. Predefining the distance has the same purpose as predefining the time period. It ensures that a thief who has stolen the motor vehicle is first separated from the driver before the safety operating state of the motor vehicle is then activated. Preferably, a distance between 100 m and 1 km is predefined.

A system according to an example embodiment of the present invention comprises a motor vehicle having at least one vehicle communication means fixed to the body and at least one user device which can be handled independently of the motor vehicle, wherein the vehicle communication means is configured to receive signals emitted by the user device. In the system according to the present invention, there is provided a controller configured to monitor, on the basis of the received signals, a distance between the user device and the motor vehicle while the motor vehicle is in operation, and to activate a safety operating state of the motor vehicle when a distance exceeding a predefined threshold value is detected. This, too, results in the aforementioned advantages. Further preferred features and combinations of features result from the disclosure herein.

According to an example embodiment of the present invention, the controller is preferably configured to control a drive device and/or a braking device of the motor vehicle so as to activate the safety operating state of the motor vehicle. Control of the drive device allows the safety operating state of the motor vehicle to be safely put into effect. Actuating the braking device provides additional advantages, for example preventing the motor vehicle from moving away from the driver, for example by coasting to a stop.

Preferably, according to an example embodiment of the present invention, the system comprises at least one further vehicle communication means, wherein the vehicle communication means and the further vehicle communication means are fixed to the body at a distance from one another. By providing the further vehicle communication means, more detailed information can be obtained with regard to the location of the user device relative to the motor vehicle. For example, one of the vehicle communication means is arranged in the area of a front end of the motor vehicle and the other of the vehicle communication means is arranged in the area of a rear end of the motor vehicle.

According to a preferred embodiment of the system of the present invention, it is provided that at least one of the vehicle communication means is configured as a Bluetooth low energy (BLE) module and/or that at least one of the vehicle communication means is configured as an ultra-wideband (UWB) module. By means of vehicle communication means so configured, the distance can be detected with a great deal of precision. For example, a UWB module allows the distance to be detected with an error of at most a few centimeters. Particularly preferably, one of the vehicle communication means is configured as a BLE module and the other as a UWB module.

Preferably, according to an example embodiment of the present invention, the user device is configured as a smartphone or smartwatch. Such devices are particularly suitable as a user device because they already have the necessary communication means to emit signals that can be received by the vehicle communication means. In addition, the location of such user devices generally corresponds to the location of the driver. For example, a smartwatch will always be worn on the driver's wrist while driving. A smartphone will always be kept by the driver in a pocket of a garment while driving. According to another exemplary embodiment, the user device is integrated into a garment for the driver. For example, the garment is a driving suit, a life vest, a helmet, or a glove.

According to a preferred embodiment of the present invention, it is provided that the motor vehicle is configured as a motorcycle, quad, snowmobile, or jet ski. In such motor vehicles, the advantages achieved by the system are particularly pronounced because the driver is typically not connected to the motor vehicle by a safety harness while driving.

The present invention will be explained in more detail in the following with reference to the figures.

DETAILED DESCRIPTION OF EXAMPLE EMBODIMENT

Figure 1:
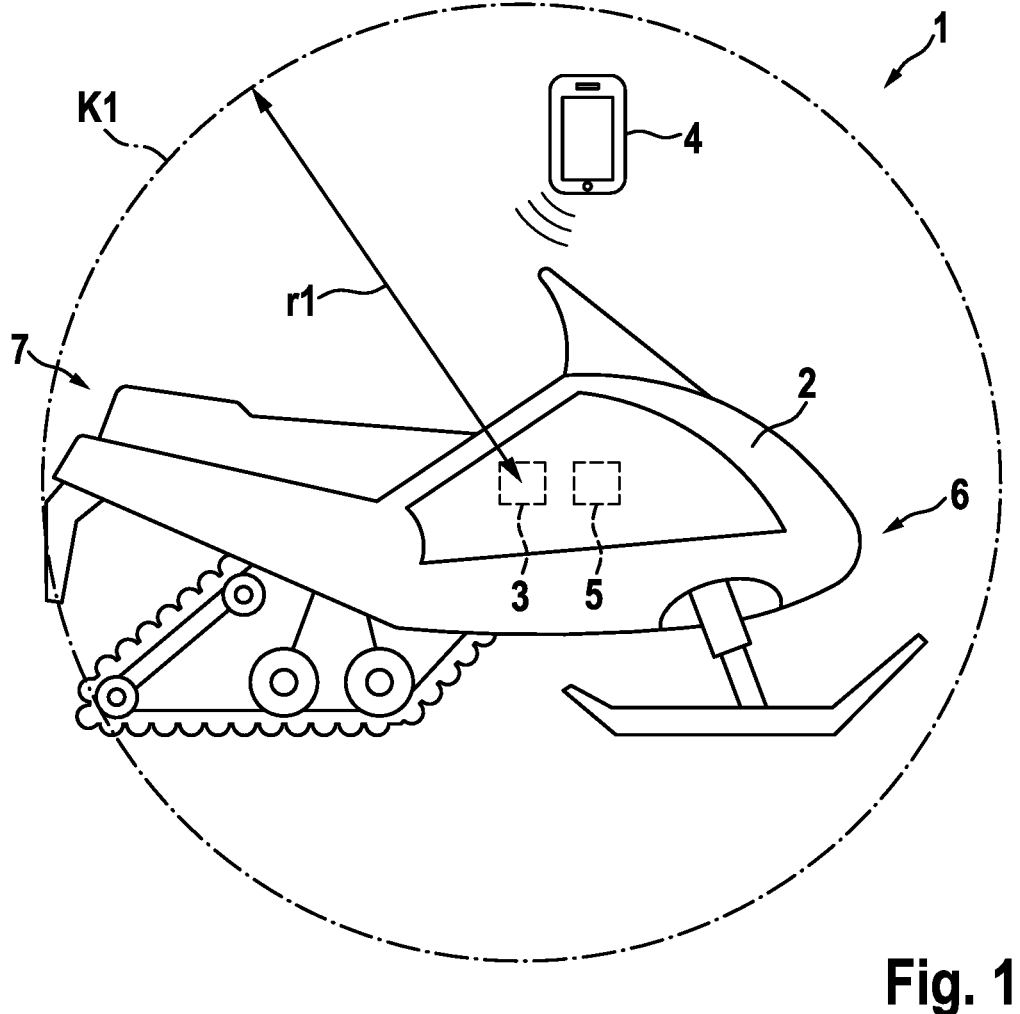
FIG. 1 shows a system for operating a motor vehicle, according to an example embodiment of the present invention.

FIG. 1 shows a system 1. The system 1 comprises a motor vehicle 2. In the present case, the motor vehicle 2 is a snowmobile 2. According to a further exemplary embodiment, the motor vehicle 2 is, for example, a motorcycle, a quad, or a jet ski.

The motor vehicle 2 comprises a vehicle communication means (i.e., arrangement) 3 fixed to the body. The vehicle communication means 3 is configured to communicate wirelessly. For example, the vehicle communication means 3 is a BLE module or a UWB module.

The system 1 also comprises a user device 4 which can be handled independently of the motor vehicle 2 and which is assigned to a driver, not shown, of the motor vehicle 2. According to the exemplary embodiment shown in FIG. 1, the user device 4 is a smartphone 4. Alternatively, the user device 4 is a smartwatch, for example. If the driver uses the motor vehicle 2, the driver typically stores the user device 4 in a pocket of a garment. As such, the distance between the user device 4 and the motor vehicle 2 corresponds to the distance between the driver and the motor vehicle 2.

The user device 4 is configured to emit signals. The vehicle communication means 3 is configured to receive signals emitted by the user device 4.

The motor vehicle 2 also comprises a controller 5. The controller 5 is configured to control the motor vehicle 2. For example, the controller 5 is configured to control a drive device of the motor vehicle 2 and/or a braking device of the motor vehicle 2.

The controller 5 is also configured to monitor or ascertain the distance between the user device 4 and the motor vehicle 2 on the basis of the signals received by the vehicle communication means 3. In the present case, there is only one vehicle communication means 3. Accordingly, the controller 5 is configured to monitor the distance between the user device 4 and the vehicle communication means 3 as a distance between the user device 4 and the motor vehicle 2.

Figure 2:
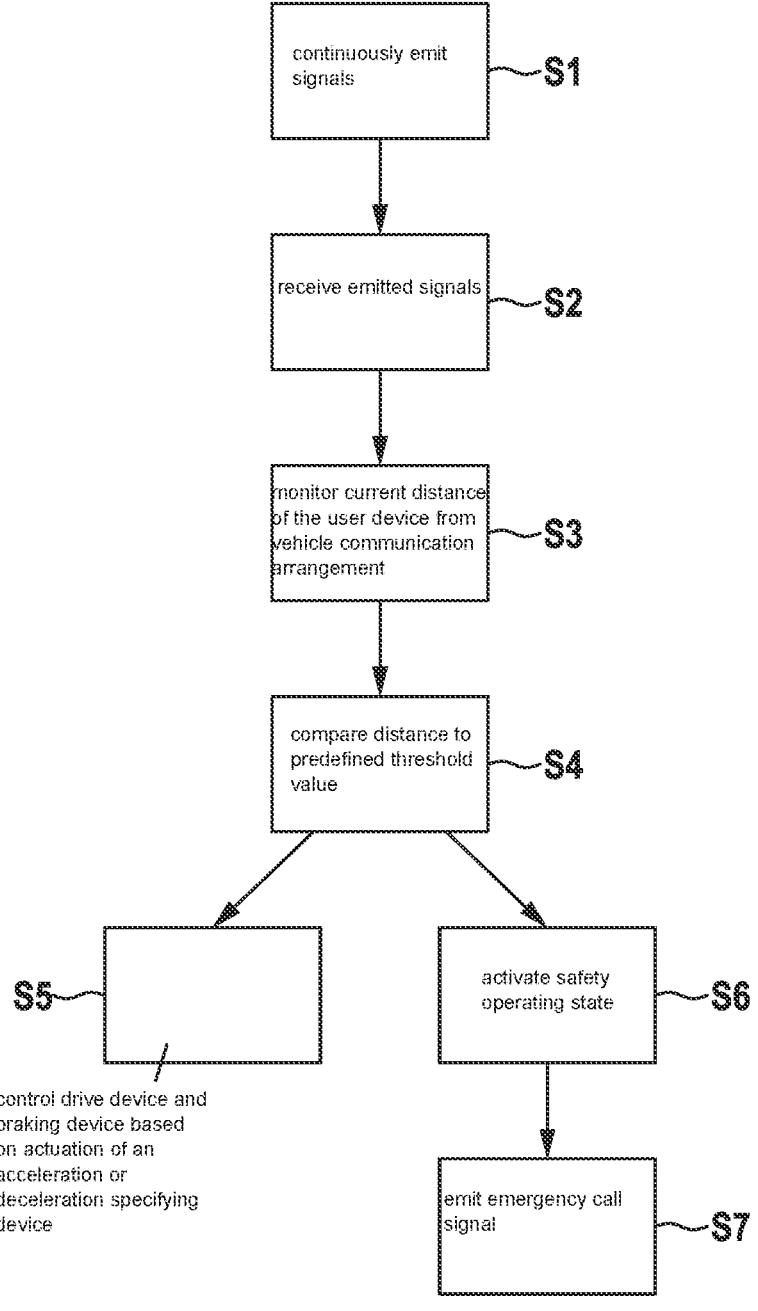
FIG. 2 shows a method for operating the motor vehicle, according to an example embodiment of the present invention.

Referring below to FIG. 2, an advantageous method for operating the motor vehicle 2 is explained in greater detail.

FIG. 2 shows the method using a flow chart. It is assumed that the driver is initially traveling using the motor vehicle 2 and is carrying the user device 4. The motor vehicle 2 is thus in operation.

In a first step S1 the user device 4 continuously emits signals that are receivable by the vehicle communication means 3. If the vehicle communication means 3 is configured as a BLE module, the user device 4 emits Bluetooth signals. If the vehicle communication means 3 is configured as a UWB module, the user device 4 emits ultra-wideband signals.

In a second step S2, the emitted signals are received by the vehicle communication means 3 and provided to the controller 5. For this purpose, the vehicle communication means 3 is communicatively connected to the controller 5 wirelessly or in a wired manner.

In a third step S3, the controller 5 monitors the current distance of the user device 4 from the vehicle communication means 3. The controller 5 thus continuously detects the current distance. For example, the controller 5 monitors the current distance on the basis of the propagation times of the received signals.

In a fourth step S4, the controller 5 compares the distance detected in step S3 to a predefined threshold value. In the present case, a threshold value of 1.5 m is predefined. The threshold value corresponds to the radius r1 of the sphere K1 shown in FIG. 1. The vehicle communication means 3 forms the center point of the sphere K1. Thus, if the distance is less than the threshold value, then the user device 4 is located within the sphere K1. If the distance is greater than the threshold value, then the user device 4 is located outside the sphere K1.

If the comparison shows that the distance detected in step S3 is below the threshold value, then reference is made to a fifth step S5. This is usually the case when the driver with the user device 4 is located on the motor vehicle 2. In the fifth step S5, controller 5 then controls the drive device and the braking device of the motor vehicle 2 on the basis of an actuation of an acceleration specifying device of the motor vehicle 2 or on the basis of an actuation of a deceleration specifying device of the motor vehicle 2.

If, however, the comparison shows that the distance ascertained in step S3 exceeds the threshold value, then reference is made to a sixth step S6. This is the case, for example, if the driver with the user device 4 has fallen off the motor vehicle 2 due to an accident involving the motor vehicle 2. In the sixth step S6, the controller 5 then activates a safety operating state of the motor vehicle 2. In the present case, the controller 5 controls the drive device such that the drive device is switched off. The operation of the motor vehicle 2 is thus interrupted by the controller 5. The controller 5 also preferably controls the braking device such that the braking device provides a braking torque that decelerates the motor vehicle 2. As a result, the motor vehicle 2 is quickly decelerated to a standstill.

In a seventh step S7, the motor vehicle 2 and/or the user device 4 emits an emergency call signal fully automatically. Preferably, the emergency call signal contains information for facilitating a rescue operation, for example information regarding the traveling speed of the motor vehicle 2 at the time of detection of a distance exceeding the threshold value and/or regarding the distance of the user device 4 from the motor vehicle 2 after the deceleration of the motor vehicle 2 to a standstill.

According to a further exemplary embodiment of the system 1, there is at least one further vehicle communication means (i.e., arrangement), wherein the vehicle communication means 3 and the further vehicle communication means are fixed to the body at a distance from one another. For example, the vehicle communication means 3 is arranged in the area of a front end 6 of the motor vehicle 2 and the further vehicle communication means is arranged in the area of a rear end 7 of the motor vehicle 2. Arranging the two vehicle communication means in this way allows the location of the user device 4 in the direction of the longitudinal axis of the motor vehicle 2 relative to the motor vehicle 2 to be monitored on the basis of the signals received by the vehicle communication means. Preferably, when the distance exceeding the threshold value is detected, the braking device is actuated on the basis of the detected location in the direction of the longitudinal axis. For example, the braking device is only actuated for the purposes of generating a braking torque which decelerates the motor vehicle 2 when it is detected that the user device 4 and thus the driver are located in front of the motor vehicle 2 in the direction of the longitudinal axis. This can occur, for example, in the event of a collision or driving over a bump.

According to the exemplary embodiment shown in FIG. 2, the safety operating state of the motor vehicle 2 is activated immediately upon detection of the distance exceeding the threshold value.

According to a further exemplary embodiment, the safety operating state is activated with a delay. For example, a time period is predefined for this purpose and the safety operating state of the motor vehicle 2 is activated only after the time period has elapsed. Alternatively or additionally, a distance is predefined and the safety operating state of the motor vehicle 2 is activated only after the motor vehicle 2 has traveled the predefined distance after the detection of the distance exceeding the threshold value. This exemplary embodiment of the method is particularly advantageous if the distance between the user device 4 and the motor vehicle 2 exceeds the threshold value because a thief has stolen the motor vehicle 2 from the driver while it is in operation. Because the safety operating state of the motor vehicle 2 is activated with a delay, the thief will first distance themself and the motor vehicle 2 from the driver. This is for the safety of the driver. For example, a time period of 1 minute is predefined, or a distance of 200 m.

The invention claimed is:

1. A method for operating a motor vehicle having at least one vehicle communication arrangement fixed to a body of the motor vehicle, the method comprising the following steps:

emitting signals by a user device, which can be handled independently of the motor vehicle and can be assigned or is assigned to a driver of the motor vehicle;

receiving the emitted signals by the vehicle communication arrangement;

monitoring a distance between the user device and the motor vehicle based on the received signals, wherein the distance is monitored during operation of the motor vehicle;

determining whether the distance exceeds a predefined threshold value at a first time;

setting at the first time, in response to determining that the distance exceeds the predefined threshold value, a second time subsequent to the first time; and activating a safety operating state of the motor vehicle when the second time is reached.

2. The method according to claim 1, wherein the safety operating state of the motor vehicle is activated by shutting down a drive device of the motor vehicle.

3. The method according to claim 1, wherein activating the safety operating state of the motor vehicle includes actuating a braking device of the motor vehicle for the purpose of generating a braking torque.

4. The method according to claim 3, further comprising:

monitoring a location of the user device in a direction of a longitudinal axis of the motor vehicle, and actuating the braking device based on the location detected.

5. The method according to claim 3, wherein the motor vehicle and/or the user device emits an emergency call signal fully automatically when the distance exceeding the threshold value is detected.

6. The method according to claim 1, wherein a distance is predefined and the safety operating state of the motor vehicle is activated only after the motor vehicle has traveled the predefined distance after the distance exceeding the threshold value has been detected.

7. A method for operating a motor vehicle having at least one vehicle communication arrangement fixed to a body of the motor vehicle, the method comprising the following steps:

emitting signals by a user device, which can be handled independently of the motor vehicle and can be assigned or is assigned to a driver of the motor vehicle;

receiving the emitted signals by the vehicle communication arrangement;

monitoring a distance between the user device and the motor vehicle based on the received signals, wherein the distance is monitored during operation of the motor vehicle; and activating a safety operating state of the motor vehicle based on detecting that the distance exceeds a predefined threshold value, wherein based on detecting the distance exceeding the threshold value, a braking device of the motor vehicle is actuated for the purposes of generating a braking torque,

wherein the motor vehicle and/or the user device emits an emergency call signal fully automatically when the distance exceeding the threshold value is detected, and wherein the emergency call signal contains information regarding a traveling speed of the motor vehicle at a time of the detection of the distance exceeding the threshold value and/or regarding the distance between the user device and the motor vehicle after the deceleration of the motor vehicle to a standstill.

8. A system, comprising:

a motor vehicle having at least one vehicle communication arrangement fixed to a body of the motor vehicle;

at least one user device which can be handled independently of the motor vehicle, wherein the vehicle communication arrangement is configured to receive signals emitted by the user device; and a controller configured to:

monitor a distance between the user device and the motor vehicle during operation of the motor vehicle based on the received signals, determine whether the distance exceeds a predefined threshold value at a first time, set at the first time, in response to determining that the distance exceeds the predefined threshold value, a second time subsequent to the first time, and activate a safety operating state of the motor vehicle when the second time is reached.

9. The system according to claim 8, wherein the controller is configured to control a drive device of the motor vehicle and/or a braking device of the motor vehicle, to activate the safety operating state of the motor vehicle.

10. The system according to claim 8, further comprising:

at least one further vehicle communication arrangement, wherein the vehicle communication arrangement and the further vehicle communication means are fixed to the body of the motor vehicle at a distance from one another.

11. The system according to claim 8, wherein at least one of the at least one vehicle communication arrangement is configured as a Bluetooth low energy (BLE) module and/or at least one of the at least one vehicle communication arrangement is configured as an ultra-wideband (UWB) module.

12. The system according to claim 8, wherein the user device is a smartphone or smartwatch.

13. The system according to claim 8, wherein the motor vehicle is a motorcycle, or a quad, or a snowmobile, or a jet ski.

* * * * *